US007856718B2

(12) United States Patent
Asikainen

(10) Patent No.: US 7,856,718 B2
(45) Date of Patent: Dec. 28, 2010

(54) METHOD OF MANUFACTURING A SCREEN CYLINDER AND A SCREEN CYLINDER

(75) Inventor: Aku Asikainen, Varkaus (FI)

(73) Assignee: Advanced Fiber Technologies (AFT TRUST) (CA)

( * ) Notice: Subject to any disclaimer, the term of this patent is extended or adjusted under 35 U.S.C. 154(b) by 556 days.

(21) Appl. No.: 11/571,984

(22) PCT Filed: Jul. 12, 2005

(86) PCT No.: PCT/FI2005/000328

§ 371 (c)(1),
(2), (4) Date: May 23, 2007

(87) PCT Pub. No.: WO2006/008332

PCT Pub. Date: Jan. 26, 2006

(65) Prior Publication Data

US 2007/0251092 A1 Nov. 1, 2007

(30) Foreign Application Priority Data

Jul. 16, 2004 (FI) .................................. 20040993

(51) Int. Cl.
*B23P 15/16* (2006.01)

(52) U.S. Cl. ................... 29/896.61; 29/896.62; 29/447; 403/273

(58) Field of Classification Search ................... 29/447, 29/896.61, 896.62; 403/273
See application file for complete search history.

(56) References Cited

U.S. PATENT DOCUMENTS

| | | | | |
|---|---|---|---|---|
| 4,450,058 | A * | 5/1984 | Lovejoy | 148/605 |
| 4,986,900 | A * | 1/1991 | Mason | 209/397 |
| 5,090,721 | A * | 2/1992 | Lange | 220/485 |
| 5,188,981 | A * | 2/1993 | Stiles et al. | 428/309.9 |
| 5,394,600 | A | 3/1995 | Chen | |
| 5,791,495 | A * | 8/1998 | Gero et al. | 209/395 |
| 5,799,798 | A * | 9/1998 | Chen | 209/306 |
| 6,047,834 | A | 4/2000 | Dolle et al. | |
| 2003/0115754 | A1* | 6/2003 | Raphael | 29/896.6 |

FOREIGN PATENT DOCUMENTS

| | | |
|---|---|---|
| WO | 2006/008332 A2 | 1/2006 |
| WO | 2006/008332 A3 | 1/2006 |

OTHER PUBLICATIONS

International Search Report for PCT/FI2005/000328.
Written Opinion of the International Search Report for PCT/FI2005/000328.

* cited by examiner

*Primary Examiner*—David P Bryant
*Assistant Examiner*—Christopher Besler
(74) *Attorney, Agent, or Firm*—Heslin Rothenberg Farley & Mesiti P.C.

(57) ABSTRACT

The present invention relates to a method of manufacturing a screen cylinder, and a screen cylinder that is particularly suitable for screening, filtering, fractionating, or sorting cellulose pulp suspensions of the pulp and paper making industry, or other similar suspensions. The present invention relates more particularly to a screen cylinder formed from a plurality of screen wires leaving screening slots therebetween, and circular support elements. The support elements include openings/grooves for installation of the screen wires therein, so that at least one of the support rings is thermally deformed and clamps the screen wires in the openings/grooves of the rings.

13 Claims, 2 Drawing Sheets

METHOD OF MANUFACTURING A SCREEN CYLINDER AND A SCREEN CYLINDER

CROSS REFERENCE TO RELATED APPLICATIONS

Figure 1:
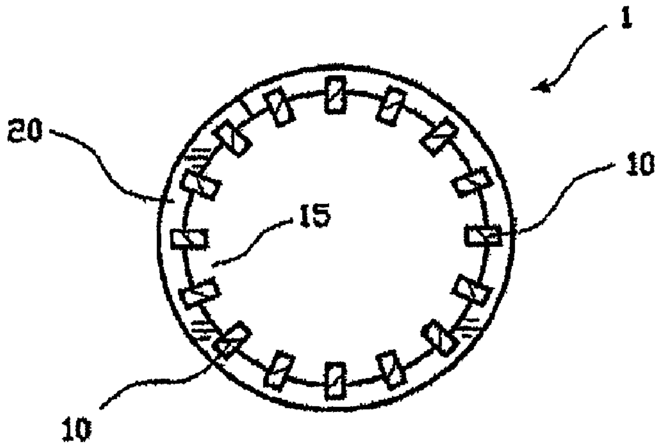
Fig. 1 PRIOR ART

This application is a national stage application of PCT International Application No. PCT/FI2005/000328 filed on Jul. 12, 2005, and published in English on Jan. 26, 2006, as WO 2006/008332, which claims priority from Finnish application No. 20040993 filed on Jul. 16, 2004, the entire disclosures of which are incorporated herein by reference.

The present invention relates to a method of manufacturing a screen cylinder, and a screen cylinder that is particularly suitable for screening, filtering, fractionating, or sorting cellulose pulp suspensions of the pulp and paper making industry, or other similar suspensions. The present invention relates more particularly to screening devices of the type comprising a plurality of screen wires positioned at a small spacing parallel to each other, the plurality of screen wires forming a screening surface facing the pulp suspension to be screened and adjacent wires forming screening openings therebetween allowing an accept portion of the pulp suspension to flow therethrough.

For instance, EP-A1-0 929 714 discusses a screening device in which the screen wires are fixed, on the downstream side of the wires, to transversely extending slots in solid support elements, support rings or support bars.

In known screening devices of this type the support elements, which form the supports for the screen wires, are formed of solid bars, mainly rectangular or round in cross section and most typically positioned perpendicular to the screen wires. Additionally, the above-mentioned EP-A1-0 929 714 discloses a wire screen where the support ring is a U-shaped bar, the screen wires being attached by means of deformation to grooves machined transverse to the support bar.

The screen wires are generally fastened to the support bars by a welding process which gives rise to a number of disadvantages such as variability distortion, thermal stresses and burrs. The heat induced by the welding often causes distortion of the wires and changes in the screening opening width between adjacent wires. It is therefore difficult to get completely uniform screening openings, which means that the efficiency of the screen suffers. Today, when the desired width of screening openings may be as small as 0.1 mm, only minimal distortions (if any) are acceptable.

The thermal stresses and the burrs may also lead to failure in operation due to the loading on the screening device in the user's process. Such loading may be either in the form of a constant load or a cyclic loading giving rise to failure by fatigue. Burrs may also catch fibers of the suspension, leading to gradual clogging of the screen or filter, or the formation of so called "strings" which are very detrimental in the user's process.

It has also been suggested, e.g. in U.S. Pat. Nos. 5,090,721 and 5,094,360, to connect screen wires by means of a certain keyhole cross section into recesses in the support bar having the same keyhole form. By bending the support bars into rings, the screen wires are clamped into position. This design, however, may not be reliable enough in the long run, and the keyhole fastening together with the clamping feature has been improved with a number of suggestions known better in the industry. In other words, gluing, soldering, welding etc. have been suggested to ensure the keyhole fastening.

The above difficulties, among others, tend to result in a poor quality of the screening or in mechanical weaknesses or in high manufacturing costs (for instance, the keyhole clamping needs a very accurate dimensioning of the keyhole groove), it is therefore an object of the present invention to minimize the above-mentioned drawbacks and provide an improved screen cylinder and an improved method of manufacturing such.

However, since the use of the keyholes in the support bars, or in the support rings, ensures that the distance between the adjacent screen wires is substantially constant, it should be studied if there are reliable and simple ways of securing the screen wires in the keyhole grooves in such a manner that the wires would not be able to move in the groove. The groove is of the keyhole construction, i.e. machined either entirely inside the support element, or ring or bar, or machined such that the keyhole is open at one side of the support element or bar or ring, the wire is able to move only in the direction of its axis. In other words, the keyhole either clamps the wire substantially tightly, or allows the wire to be slid into the keyhole in the direction of the axis of the wire. Thus it is clear that the keyhole prevents the screen wire from moving in the direction of the pressure pulses created during the screening.

It is thereby also an object of the present invention to provide an easily manufactured and assembled screen cylinder without thermally inducing distortion of the screen wires.

It is also an object of the present invention to provide an improved strong screen cylinder with accurate and consistent screening openings, i.e. screening slots.

It is thereby further an object of the present invention to provide an improved method of manufacturing a screen cylinder, so that uniform screening openings, i.e. good tolerances, are provided, whereby slots with very small widths may be manufactured.

It is further an object of the present invention to provide an improved screen cylinder with the minimum of burrs or other protruding elements causing accumulation of fibers on upstream side surfaces of the support rods.

In accordance with another preferred embodiment of the invention the support elements are in the form of individual rings arranged at an axial distance from each other. At least one of the support rings is heat-treated such that it bends and clamps the screen wires in openings/grooves in the support ring.

A characterizing feature of the method of manufacturing a screen cylinder, said screen cylinder being formed of at least a number of screen wires leaving a screening slot therebetween, and substantially circular support elements, said support elements being in the form of rings, said support rings having openings/grooves into which said screen wires are installed, is a. installing the screen wires in said openings/grooves of said support rings,
b. heating at least one of said rings so that only one lateral face of said ring is heated, to thermally expand the ring unevenly,
c. allowing said at least one ring to cool down, whereby the ring retracts unevenly clamping of the screen wires in said openings/grooves A characterizing feature of the screen cylinder, said screen cylinder being formed of at least a number of screen wires leaving a screening slot therebetween, and of substantially circular support elements, said support elements being in the form of support rings, said support rings having openings/grooves for installation of said screen wires therein, is that at least one of said support rings is heat-treated such that it is bent to clamp the screen wires tightly in the openings/grooves.

The other characterizing features of the invention will become apparent from the appended claims.

Figure 2:
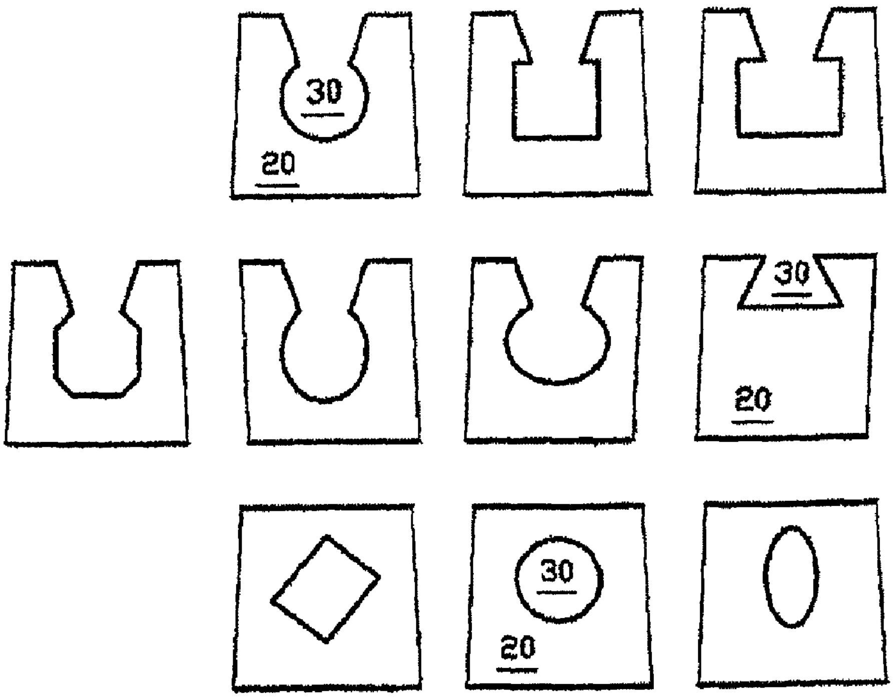
Fig. 2 PRIOR ART
Figure 3A:
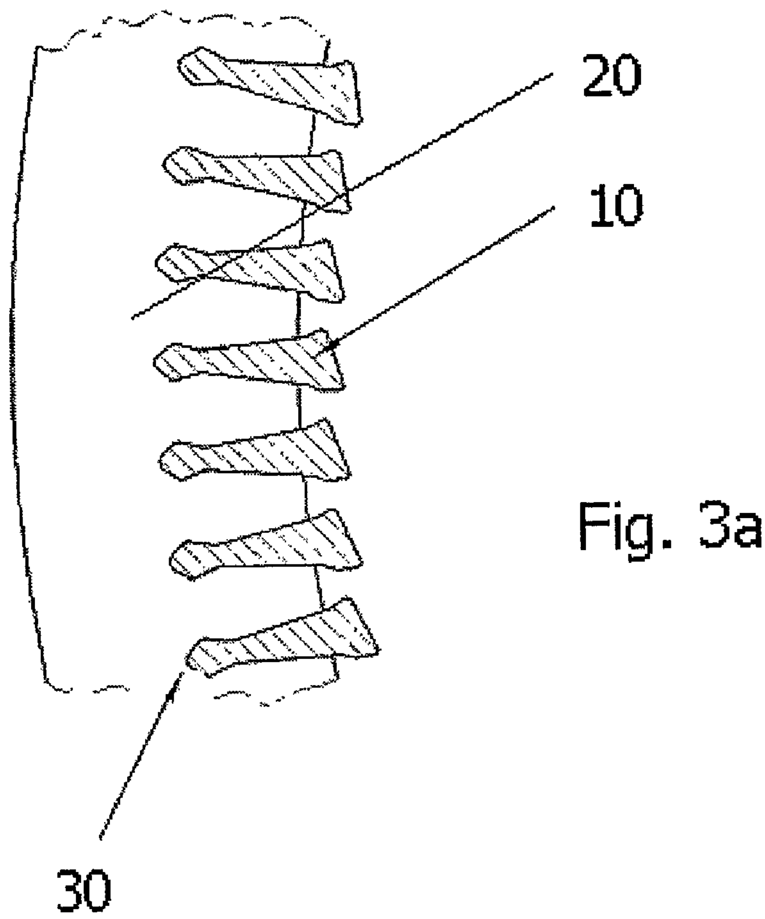
Figure 3B:
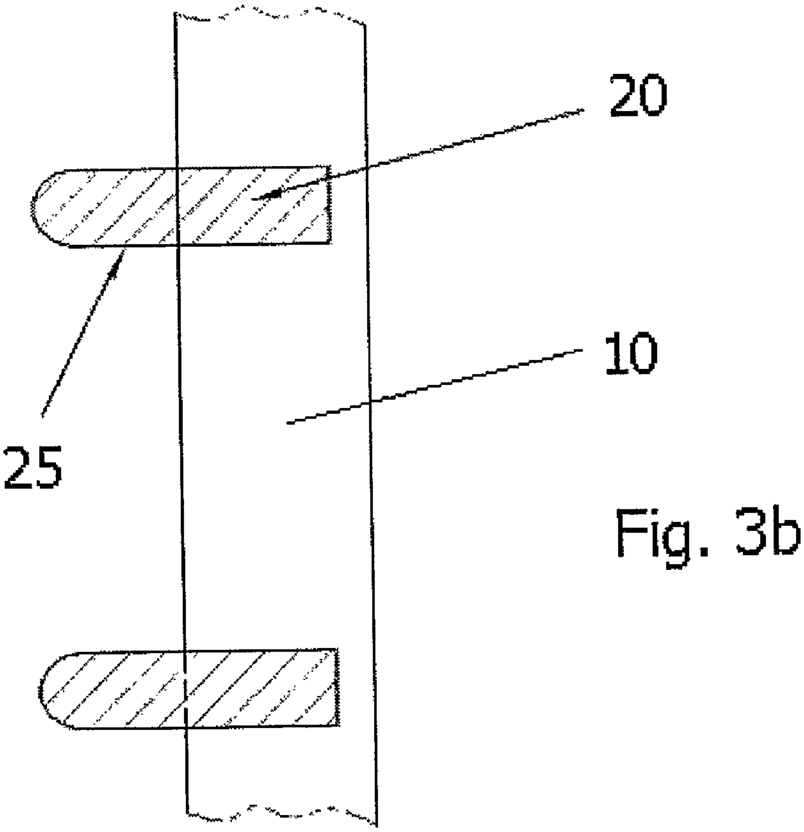

In the following the method of manufacturing a screen cylinder and a screen cylinder will be explained in a more detailed manner with reference to the accompanying drawings of which FIG. 1 illustrates schematically a wire screen cylinder of prior art, FIG. 2 illustrates schematically various embodiments of keyholes arranged, for instance machined, in the prior art support elements, FIGS. 3*a* and 3*b* illustrate a preferred embodiment of the support element-screen wire combination of the present invention.

FIG. 1 shows schematically a wire screen cylinder 1 of prior art. The screen cylinder of FIG. 1 is shown cut at its center, or body part i.e. between the top and the bottom of the screen cylinder. Thus the end rings, or the top and bottom rings of the screen cylinder are not shown. The screen cylinder 1 is made of substantially axially oriented screen wires 10, so-called wedge wires (originally the wire cross-section resembled a wedge), which are fastened to support elements 20 at the body part of the screen cylinder, and to the already discussed end rings at the ends of the cylinder. Most often the wedge wire screen cylinder is of the so-called outflow type whereby the screen wires are attached to the radially inner sides of the support elements and the accept flows from the inside of the screen cylinder to the outside thereof. However, also so-called inflow type wedge-wire screen cylinders are known. The distance between the adjacent wires 10 defines screening slots 15. The slot width is normally about 0.1-0.3 mm depending on the application of the screen cylinder 1. There is a number of substantially circular support elements 20 arranged along the length of the screen wires in such a manner that the axial distance between the support elements is about 20 to 200 mm depending again on the size and the application of the screen cylinder 1. The height (in the axial direction of the screen cylinder) of the support element is normally about 3 to 10 mm and radial width from about 15 to about 50 mm. However, the dimensions may also vary from the above-mentioned ones in some special circumstances. The screen cylinder is often manufactured such that the screen wires 10 are fastened to support bars before the screen is rolled to a cylinder whereby the support bars form the support elements after the rolling, or the screen wires may be fastened to the support elements after the bars have been bent to circular rings.

A common way of fastening the screen wires to the support elements is to use in the support elements 20 substantially transverse grooves or openings into which the screen wires 10 are inserted. FIG. 2 shows a few alternatives for the shape of the so-called keyhole or dovetail groove 30 in the support element 20 or support bar. Also some alternatives for openings in the support element have been illustrated. The grooves and openings have a few common features. Firstly, the groove/opening 30 is normally machined at substantially right angles to the bar, or element. And, secondly, as shown by the drawings the basic idea of the keyhole groove 30 (and naturally of an opening, too) is to secure the screen wire in the groove 30 so that the screen wire cannot move but in the direction of the wire axis, i.e. at right angles to the support element. In other words, so-called form locking is used. Naturally, the movement of the screen wire in the direction of its axis is not a desired feature either, but it can be utilized in the manufacture of the screen cylinder. In other words, if clamping of the wire in the groove, as discussed in U.S. Pat. Nos. 5,090,721 and 5,094,360, is not used for fastening the wires in the groove, the support bars may be readily bent to circular support elements 20 whereafter the wires are pushed in the grooves 30. In this case the size and shape of the grooves 30 should be as close as possible to the one of the cross-section of the screen wire. Then, to prevent the wires from moving in their axial direction, the wires may be welded, glued or soldered to the support bar, or the wire may be deformed so as to prevent its movement. However, all the discussed fastening methods are complicated, may create burrs, which collect fibers, or are otherwise not ideal for their desired purpose.

FIG. 3*a* illustrates a partial cross-section of a screen cylinder in an enlarged scale showing the support ring 20 and the cross section of screen wires 10 in one of their numerous preferred forms. FIG. 3*b* is likewise a partial, now axial section of the screen cylinder showing the cross section of the support ring 20.

A preferred way, but of course not the only way of manufacturing a screen cylinder in accordance with the present invention is such that the support elements 20 in the form of circular rings with appropriate keyhole or dovetail grooves or corresponding openings are attached to a jig. Next, screen wires 10 are pushed through the grooves/openings 30 in the support elements 20. Preferably, the grooves or openings in all the elements/rings are alike. After all the screen wires 10 have been inserted in the grooves/openings 30 of the support elements 20 the screen wires are fastened so that they cannot move in the direction of their axis any more. This is performed by means of heating at least one support element 20 via its one face 25. In other words, the heating is performed unevenly, on one lateral side of the support ring only. The result is that the lower face of the support ring in FIG. 3*b* expands thermally whereby especially the free rim of the support ring bends upwards round the circumferential axis of the ring. If the support rings are made of stainless steel the heating temperature for the rings is about 450-900 degrees Celsius, which ensures that the internal stresses in the support ring material are released. After heating the support ring is allowed to cool down in room temperature whereby the support ring starts bending back round its circumferential axis, and finally the free rim of the support ring bends downward i.e. past its original position. It is a characterizing feature of stainless steel that, when its temperature is first raised to a certain range the internal stresses of the product are released, the cooling of the particle results in greater thermal shrinkage than what the thermal expansion originally was. The result of all this is that while the support ring bends past its 'horizontal' original position the minor gap required for the screen wire installation between the wire and the walls of the groove/opening in the support ring is closed, and the support ring clamps the screen wire in the groove/opening.

This kind of heat treatment does not necessarily have to be performed for all support rings of a screen cylinder but, naturally, for at least one of them. However, it is preferable to subject all support rings to the heat treatment as in that case the minor gaps between the wires and the walls of the openings/grooves are removed.

A preferable way of treating the support rings is to first position the screen cylinder, after all the wires are inserted into grooves of all support rings, on rolls. Then rotate the cylinder slowly, and heat one face of one support ring at a time so that the temperature of the support ring rises locally and temporarily to between 450 and 900 degrees. The heating has to be temporary so that the characteristics (mainly the corrosion resistance) of the stainless steel do not, however, change (changing the characteristics needs hours, whereas the heat treatment of the invention takes only minutes). In order to be able to heat a very limited area of the surface of the support ring, preferably a welding torch is used either manually or automatically. Also, it is worth consideration if the screen wires need to be covered with some kind of heat insulation so that they will not be heat-treated, too. A preferable heat shield is a strip of metal positioned between two adjacent support rings on screen wires before starting the heating.

It should be understood that the above is only an exemplary description of a novel and inventive method of manufacturing a screen cylinder. The above should not be understood as limiting the invention by any means but the entire scope of the invention is defined by the appended claims only.

The invention claimed is:

1. A method of manufacturing a screen cylinder, said screen cylinder comprising a plurality of screen wires having screening slots therebetween, and substantially circular support rings, said support rings having openings for receiving said screen wires, wherein the method comprises:

a) installing the screen wires in said openings of said support rings, b) heating at least one of said rings to thermally expand the ring unevenly, and c) allowing said at least one ring to cool, whereby the ring retracts unevenly clamping the screen wires in said openings.

2. The method as recited in claim 1, wherein said heating comprises temporarily and locally heating the support ring to between 450 and 900 degrees Celsius.

3. The method as recited in claim 1, wherein the heating is performed with a welding torch.

4. The method as recited in claim 1, wherein the method further comprises, before step b), positioning the cylinder on rolls, and, during step b), rotating the cylinder.

5. The method as recited in claim 1, wherein heating comprises heating all of the support rings.

6. The method as recited in claim 1, wherein the method further comprises, prior to step b), positioning a heat shield on the screen wires.

7. The method as recited in claim 1, wherein the openings are adapted to allow form-locking of the screen wires in the support rings.

8. The method as recited in claim 3, wherein the method further comprises, prior to step b), positioning a heat shield on the screen wires.

9. The method as recited in claim 1, wherein the openings comprise grooves.

10. The method as recited in claim 1, wherein said at least one of said rings comprises a lateral face, and wherein heating comprises locally heating said lateral face.

11. The method as recited in claim 1, wherein heating at least one of said rings comprises locally heating at least one of said rings.

12. The method as recited in claim 1, wherein heating at least one of said rings comprises heating to thermally expand a free rim of the support ring so that the free rim bends upwards.

13. The method as recited in claim 12, wherein said allowing said at least one ring to cool comprises allowing said at least one ring to cool and bend downward past an original unheated position.

* * * * *

UNITED STATES PATENT AND TRADEMARK OFFICE

CERTIFICATE OF CORRECTION

PATENT NO. : 7,856,718 B2
APPLICATION NO. : 11/571984
DATED : December 28, 2010
INVENTOR(S) : Aku Asikainen It is certified that error appears in the above-identified patent and that said Letters Patent is hereby corrected as shown below:

Title Page
In the Assignee (73) Delete "Advanced Fiber Technologies (AFT Trust)" and insert --Advanced Fiber Technologies (AFT) Trust--

Signed and Sealed this
Ninth Day of August, 2011

David J. Kappos
*Director of the United States Patent and Trademark Office*